(12) United States Patent
Brekke et al.

(10) Patent No.: US 9,858,810 B2
(45) Date of Patent: Jan. 2, 2018

(54) ARRANGEMENT AND METHOD FOR CONTROLLING AND/OR MONITORING A SUBSEA DEVICE

(75) Inventors: Endre Brekke, Trondheim (NO); Vegard Horten, Rasta (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 209 days.

(21) Appl. No.: 13/876,369

(22) PCT Filed: Mar. 28, 2011

(86) PCT No.: PCT/EP2011/054671
§ 371 (c)(1),
(2), (4) Date: Aug. 7, 2013

(87) PCT Pub. No.: WO2012/041535
PCT Pub. Date: Apr. 5, 2012

(65) Prior Publication Data
US 2013/0307699 A1    Nov. 21, 2013

(30) Foreign Application Priority Data
Sep. 29, 2010 (EP) .................... 10182042

(51) Int. Cl.
*H04B 13/02* (2006.01)
*G08C 19/00* (2006.01)
(Continued)

(52) U.S. Cl.
CPC ......... *G08C 19/00* (2013.01); *G05B 19/0421* (2013.01); *H04L 12/40032* (2013.01);
(Continued)

(58) Field of Classification Search
CPC .... G08C 13/00; G08C 19/00; G05B 19/0421; G05B 2219/25142; G05B 2219/25232; H04L 12/40032
(Continued)

(56) References Cited

U.S. PATENT DOCUMENTS 6,021,848 A * 2/2000 Breivik ................. B63B 21/508
166/267
8,133,041 B2 * 3/2012 Ludlow ..................... F04B 5/00
417/322
(Continued)

FOREIGN PATENT DOCUMENTS

CN      101483818 A       7/2009
WO   2012/041535 A1      4/2012  .......... G05B 19/042

OTHER PUBLICATIONS

Seah, Winston K.G. et al., "Multipath Virtual Sink Architecture for Underwater Sensor Networks," Oceans 2006 Asia Pacific, IEEE, XP031168017, 6 pages, 2006.
(Continued)

*Primary Examiner* — Zhen Y Wu
(74) *Attorney, Agent, or Firm* — Slayden Grubert Beard PLLC

(57) ABSTRACT

An arrangement for controlling and/or monitoring at least one subsea device may include: a first level node communicatively, in particular electrically and/or fiberoptically connectable to an equipment above a sea surface of a sea; at least one second level node communicatively, e.g., electrically and/or fiberoptically connected to the first level node and electrically connectable to the at least one subsea device, wherein the first level node and the at least one second level node are arrangeable at a sea bottom of the sea. A corresponding method is also disclosed.

13 Claims, 1 Drawing Sheet

(51) Int. Cl.
*G05B 19/042* (2006.01)
*H04L 12/40* (2006.01)

(52) U.S. Cl.
CPC .............. *G05B 2219/25142* (2013.01); *G05B 2219/25232* (2013.01)

(58) Field of Classification Search
USPC .............................................. 340/850, 853.1
See application file for complete search history.

(56) References Cited

U.S. PATENT DOCUMENTS

| | | | | |
|---|---|---|---|---|
| 2002/0108077 | A1* | 8/2002 | Havekost | G05B 23/0251 714/47.2 |
| 2003/0023795 | A1* | 1/2003 | Packwood | H04L 69/18 710/105 |
| 2004/0199351 | A1* | 10/2004 | Ott | G05B 9/02 702/108 |
| 2004/0260405 | A1* | 12/2004 | Eddie | G05B 19/0426 700/3 |
| 2004/0262008 | A1* | 12/2004 | Deans | E21B 41/0007 166/339 |
| 2005/0007249 | A1* | 1/2005 | Eryurek | G05B 23/027 340/511 |
| 2005/0271476 | A1* | 12/2005 | Chiesa | E21B 43/0107 405/172 |
| 2005/0276233 | A1* | 12/2005 | Shepard | H04L 69/08 455/426.2 |
| 2006/0155392 | A1* | 7/2006 | Fay | G05B 15/02 700/18 |
| 2008/0080395 | A1* | 4/2008 | Law | G05B 19/4186 370/254 |
| 2008/0082299 | A1* | 4/2008 | Samardzija | G05B 23/021 702/187 |
| 2009/0018672 | A1* | 1/2009 | Gienke | H04L 1/20 700/1 |
| 2010/0025539 | A1* | 2/2010 | Hanlon | B64C 13/04 244/223 |
| 2010/0040375 | A1* | 2/2010 | Sexton | H04B 11/00 398/104 |
| 2010/0059229 | A1* | 3/2010 | Smith | E21B 43/013 166/346 |
| 2010/0074776 | A1* | 3/2010 | Ludlow | F04B 5/00 417/415 |
| 2013/0074631 | A1* | 3/2013 | Hanlon | B64C 13/04 74/471 XY |
| 2014/0208881 | A1* | 7/2014 | Voiles | B64C 13/04 74/471 XY |

OTHER PUBLICATIONS

Kerstens, Bjørn et al., "Poster Abstract: Seastar Underwater Acoustic Local Area Network," WUWNET Canada, XP002560214, 2 pages, May 1, 2006.
International Search Report and International Preliminary Report on Patenatability, Application No. PCT/EP2011/054671, 13 pages, Jun. 22, 2011.

* cited by examiner

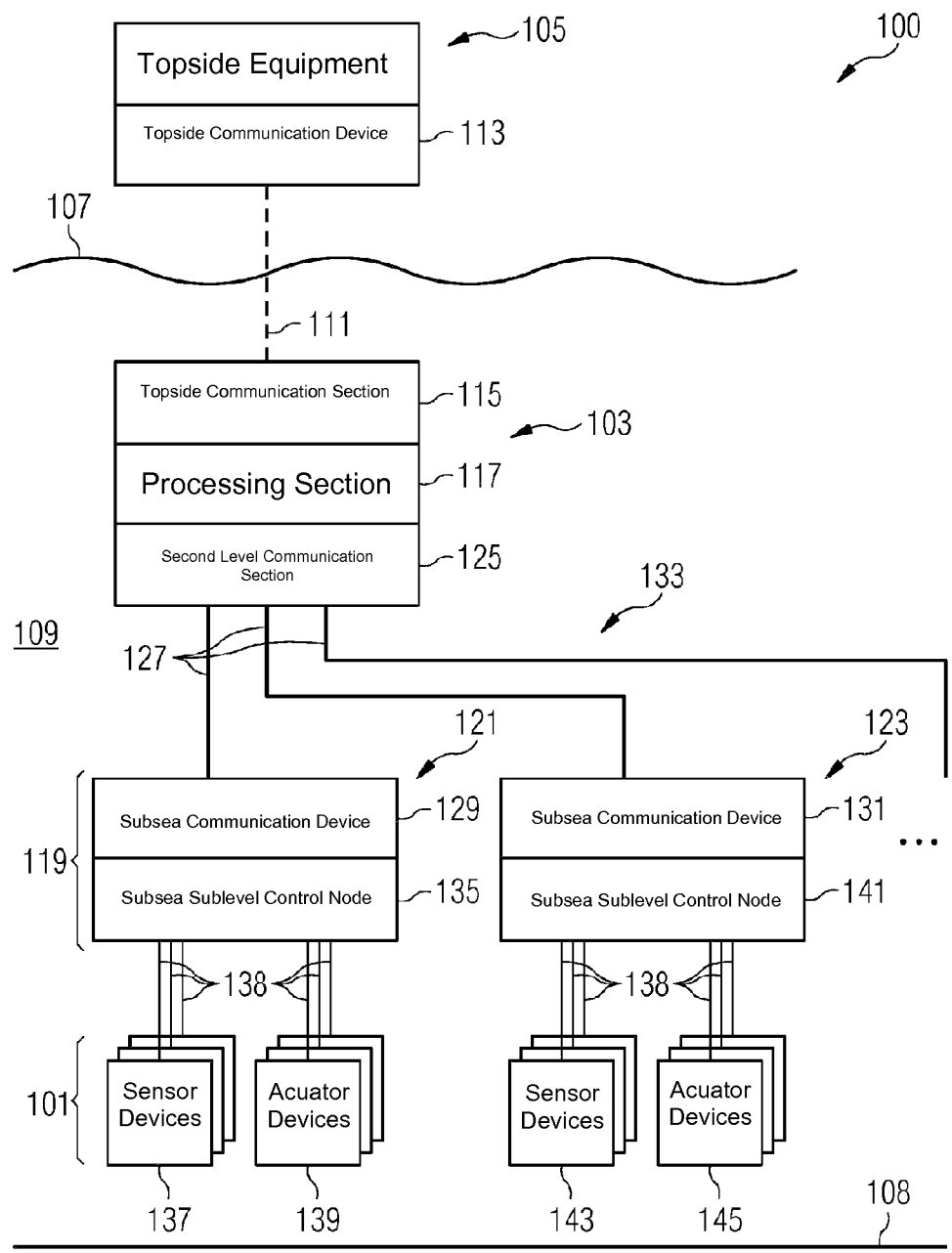

ARRANGEMENT AND METHOD FOR CONTROLLING AND/OR MONITORING A SUBSEA DEVICE

CROSS-REFERENCE TO RELATED APPLICATIONS

This application is a U.S. National Stage Application of International Application No. PCT/EP2011/054671 filed Mar. 28, 2011, which designates the United States of America, and claims priority to EP Patent Application No. 10182042.1 filed Sep. 29, 2010 The contents of which are hereby incorporated by reference in their entirety.

TECHNICAL FIELD

The present disclosure relates to an arrangement and to a method for controlling and/or monitoring a subsea device located at a bottom of a sea. In particular, the disclosure relates to an arrangement and to a method for controlling and/or monitoring a subsea device, wherein for example a subsea power grid and/or subsea communication grid is controlled.

BACKGROUND

A subsea equipment, such as an oil bore equipment, requires electrical energy and also an arrangement for controlling and/or monitoring of one or more subsea sensors and/or subsea actuators that are comprised within the subsea equipment. In particular, it may be required to receive measurement data from one or more subsea sensors, to collect the measurement data, to process these measurement data and forward the measurement data to a top side equipment located above the surface of the sea. Further, it may be required to communicate the raw measurement data and/or the processed measurement data to one or more actuators, such as pumps located at the bottom of the sea or to provide at least control data to the one or more actuators, wherein the control data may depend on the received and/or processed measurement data.

Conventionally, the measurement data may be guided or sent from the one or more sensors located at the bottom of the sea to the topside equipment where they may be processed. After processing the measurement data at the topside equipment the topside equipment may further derive control data for controlling an actuator at the bottom of the sea, wherein the control data may depend on the received measurement data. Subsequently the control data may be transmitted from the topside equipment to the actuator at the bottom of the sea.

It has been observed that the conventional method and arrangement for controlling and/or monitoring a subsea device may be inefficient in particular regarding communication overhead.

There may be a need for an arrangement and for a method for controlling and/or monitoring a subsea device, wherein the arrangement and method is simplified compared to a conventional arrangement or method and wherein less communication overhead is required. Further, there may be a need for an arrangement and a method for controlling and/or monitoring a subsea device, wherein less equipment is required, thus saving costs.

SUMMARY

One embodiment provides an arrangement for controlling and/or monitoring at least one subsea device, the arrangement comprising: a first level node communicatively, in particular electrically and/or fiberoptically, connectable to an equipment above a sea surface of a sea; at least one second level node communicatively, in particular electrically and/or fiberoptically, connected to the first level node and electrically connectable to the at least one subsea device, wherein the first level node and the at least one second level node are arrangeable at a sea bottom of the sea.

In a further embodiment, the arrangement further comprises a subsea data bus via which the second level node is communicatively, in particular electrically and/or fiberoptically, connected to the first level node.

In a further embodiment, the arrangement further comprises at least one data interface, wherein the at least one second level node is adapted to communicate with the at least one subsea device using the interface.

In a further embodiment, the at least one second level node is adapted to communicate with at least one of a sensor generating a measurement signal and an actuator comprised in the at least one subsea device.

In a further embodiment, the at least one second level node comprises a first second level node and a second level node, the first level node is adapted to receive a measurement signal from a sensor included in a first device of the at least one subsea device, and to transmit a control signal to an actuator included in a second device of the at least one subsea device, wherein the control signal is based on the measurement signal.

In a further embodiment, the first level node comprises a topside communication section for communicating with the equipment above the sea surface of the sea, a processing section for processing a measurement signal received from the at least one second level node and for generating a control signal for transmission to the at least one second level node, and a second level communication section for communicating the measurement signal and the control signal with the at least one second level node.

In a further embodiment, the first level node further comprises a water sealed container enclosing at least one of the topside communication system, the processing section, and the second level communication section.

In a further embodiment, the first level node is connected to the at least one second level node in a star configuration or a ring configuration or a line configuration.

In a further embodiment, the first level node is configurable from the equipment above the sea surface of the sea.

In a further embodiment, the arrangement is adapted for controlling and/or monitoring at least one subsea device, wherein the at least one subsea device comprises at least one electrical device of a subsea electric power grid, in particular a transformer, a controllable switch, a converter, an inductor, and a capacitor.

In a further embodiment, the arrangement further comprises at least one third level node communicatively, in particular electrically and/or fiberoptically, connected to the at least one second level node, wherein the at least one second level node is communicatively, in particular electrically and/or fiberoptically, connectable to the at least one subsea device via the at least one third level node and wherein the at least one third level node is arrangeable at the sea bottom of the sea.

Another embodiment provides a method for controlling and/or monitoring at least one subsea device, the method comprising: communicating controlling data and/or monitoring data between at least one second level node and the at least one subsea device, wherein the at least one second level node is arranged at a sea bottom of a sea; and communicating the controlling data and/or monitoring data between the at least one second level node and a first level node, wherein the first level node is connectable to an equipment above a sea surface of the sea and wherein the first level node and the at least one second level node are communicatively, in particular electrically and/or optionally fiberoptically, connected.

In a further embodiment, the method performed at a depth below the sea surface, wherein the depth amounts to between 500 m and 5000 m, in particular between 2000 m and 4000 m.

In a further embodiment, the method further comprises measuring at least one of a pressure and a temperature or any other physical quantity by a sensor comprised in a first subsea device of the at least one subsea device to obtain measurement data; and transferring the measurement data to the first level node via the second level node.

In a further embodiment, the method further comprises determining control data by the first level node based on the measurement data; transferring the control data from the first level node via the second level node to an actuator comprised in a second subsea device of the at least one subsea device; and controlling the actuator, e.g., a pump or a compressor, based on the control data.

BRIEF DESCRIPTION OF THE DRAWINGS

Exemplary embodiments will be explained in more detail below based on the FIG. 1, which schematically illustrates a block diagram of an arrangement for controlling and/or monitoring at least one subsea device according to an embodiment.

DETAILED DESCRIPTION

According to an embodiment an arrangement for controlling (in particular sending control data, driving or regulating) and/or monitoring (in particular receiving measurement data, acquiring status data, reading configuration data, obtaining temperature measurement data or obtaining pressure measurement data) at least one subsea device (such as a sensor device comprising one or more sensors, such as a temperature sensor or a pressure sensor, or an actuator device comprising one or more actuators, such as a pump or a compressor, the subsea device being adapted to be operated at a bottom of the sea, such as 1000 m to 4000 m below a surface level of the sea), wherein the arrangement comprises a first level node (in particular a water sealed unit or canister comprising electronic or electrical equipment providing in particular communication interfaces to one or more devices connectable to the first level node, the first level node being in particular adapted to be placed at the bottom of the sea, in particular close to an operation side, such as an oil bore side) electrically connectable (in particular using an electrical wire comprising one or more conductors isolated from each other, wherein the electrical wire in particular enables transmitting of electrical power from the equipment above the sea surface to the first level node and also allows communication between the equipment above the sea surface and the first level node) to an equipment (such as a swimming platform swimming on the sea, such as an oil platform or an onshore equipment) above a sea surface of a sea (i.e. in particular not located at the bottom of the sea but in a region which is accessible for a maintenance personnel, in particular in a region between 100 m below the surface of the sea and an arbitrary distance above the sea surface); at least one second level node (which may in particular be configured as another subsea unit or canister comprising a water sealed or water tight container comprising electrical and/or electronic equipment for handling electrical power and/or communication data, in particular further comprising one or more interfaces for routing the communication data between the first level node and the at least one subsea device) electrically connected (in particular using an electrical wire leading from the second level node to the first level node, the electrical wire being connected to the second level node using water sealed connectors) to the first level node (such that a wire comprising one or more conductors is arranged between the first level node and the second level node, the electrical wire in particular allowing exchange of data between the second level node and the first level node, in particular control data and/or measurement data or also for exchanging electrical power) and wherein the second level node is also electrically connectable (in particular electrically connected using an electrical wire leading to the at least one subsea device) to the at least one subsea device (the electrical connection being in particular for exchanging control and/or measurement data or/and for providing electrical energy to the subsea device, in particular from the first level node via the second level node to the subsea device), wherein the first level node and the at least one second level node are arrangeable (in particular arranged, in particular attachable or fixable, in particular fixed or attached) at a sea bottom of the sea (or at least in a region between the sea bottom of the sea and a location above the sea bottom which is away from the sea bottom less than 500 m, in particular less than 100 m, further in particular less than 25 m).

For example, the arrangement for controlling and/or monitoring allows to construct a hierarchical control system according to an embodiment. In particular, the subsea control system (which is also referred to as the arrangement for controlling and/or monitoring the subsea device) is not a flat structure or configuration as a conventional system may be, wherein all subsea control nodes or subsea devices are connected to the topside equipment. Thereby, the conventional solution (which may use a multidrop modem approach) requires a great amount of communication links from each subsea device to the topside equipment.

According to an embodiment less subsea cabling is required and higher data quality is provided compared to a conventional arrangement. In particular, only the first level node may be communicatively, in particular electrically and/or fiberoptically, connected to the equipment above a sea surface (also referred to as topside equipment), whereas neither the second level node nor any of the subsea devices is required to be connected to the topside equipment.

The first level node (also referred to as subsea main control node) may communicate with the topside equipment and via a subsea bus to the at least one second level node (also referred to as sublevel control node). In turn, the one or more sublevel control nodes may communicate directly to sensors and/or actuator via one or more (different or same) interfaces and may forward these data via the subsea bus to the main control node.

For example, it may be enabled that the subsea main control node (i.e. the first level node) performs some intelligent functions by first receiving measurement data from one or more sensors (via the second level node), processing these measurement data, deriving control data based on the measurement data and forwarding or communicating the control data to one or more actuators (via the second level node) at the bottom of the sea. Thereby, feeding the measurement data to the topside equipment, and processing the measurement data at the topside equipment is not required, thus simplifying the data communication and making the controlling and/or monitoring method faster. In particular, subsea coordinated control functions may be performed by the subsea main control node without requiring the topside equipment.

For example, the at least one second level node (i.e. the sublevel control node) may forward data to and from all subsea control nodes (i.e. the at least one subsea device), such that there is no need for a separate logical connection (or communication connection) for all subsea control nodes to the topside equipment. In particular, the first level node (the main control node) may enable more autonomous subsea control system functions and more reliable functionality. Thereby, the first level node may in particular comprise a processor, a storage and reprogrammable program code for receiving the measurement data, processing the measurement data, deriving control data and forwarding the control data to the one or more actuators.

The first level node may be connected to 2, 3, 4, 5, 6, 7, 8, 9, or 10 to 50 second level nodes, wherein each second level node may be connected to one or more subsea devices.

Less cabling at the subsea may be required due to the usage of a bus connecting sublevel control nodes that interface all input and output and may forward data to the main subsea control node via the subsea bus. Thereby, in particular a subsea control structure may be provided that is highly adaptable to subsea sensor/actuator topology, such as a star topology, ring topology or the like. In particular, the first level node may handle data from the one or more sensor devices, transform the data, transform the data to a high level data structure and process the data. In particular, the first level node may be configurable from the topside equipment for changing a coordination of the subsea devices.

The sensor device may in particular be adapted for measuring a pressure or a temperature and the actuator device may in particular comprise a pump, a motor, in particular a multiphase pump.

According to an embodiment a subsea data bus (in particular a data communication infrastructure) via which the second level node is electrically connected to the first level node is comprised within the control and/or monitoring arrangement. The subsea data bus may comprise a fiber optic conductor and/or an electrical wire having one or more conductors, wherein data transported via the subsea data bus adhere to a particular data transfer protocol. In particular, a conventional data bus or a conventional data transfer protocol may be employed, thus reducing the costs of the control and monitoring arrangement.

According to an embodiment the control and monitoring arrangement further comprises at least one data interface, wherein the at least one second level node is adapted to communicate with the at least one subsea device using the interface (defining in particular a data transfer method and a type of connectivity between the second level node and the subsea device). In particular the second level node may provide one, two, three, four, five or even more different interfaces for connecting different types of subsea devices which adhere to these different interfaces. Thereby, a great flexibility of the control and monitoring equipment or arrangement is provided.

According to an embodiment the at least one second level node is adapted to communicate (in particular to exchange data in a bidirectional way) with at least one of a sensor generating a measurement signal (for example a signal representing a pressure measurement value or a temperature measurement value) and an actuator (such as a pump or a motor) comprised in the at least one subsea device. Thus, the second level node may receive measurement data from a sensor and may send control data to an actuator. Thereby, a subsea operation using the at least one subsea device may be coordinated by the first level node via the second level node.

According to an embodiment the at least one second level node comprises a first second level node and a second second level node both connected to the first level node, wherein the first level node is adapted to receive, via the first second level node, a measurement signal from a sensor included in a first device of the at least one subsea device, and to transmit, via the second second level node, a control signal to an actuator included in a second device of the at least one subsea device (wherein the sensor is in particular connected or connectable to the first second level node and wherein the actuator is in particular connected or connectable to the second second level node), wherein the control signal is based on the measurement signal. In particular, the first level node may be adapted to receive the measurement signals from the sensor via the first second level node and in particular the first level node may be adapted to transmit the control signal to the actuator via the second second level node. Thereby, in particular the first level node may coordinate actions or operations of at least one actuator and/or at least one sensor comprised in the at least one subsea device.

According to an embodiment the first level node comprises a topside communication section (such as a portion of an electronic circuitry or/and a portion of a hardware) for communicating with the equipment above the sea surface of the sea (the topside communication section in particular comprising an interface defining a manner of exchange of data), a processing section (in particular comprising a processor, a storage and a program which may be configurable or reprogrammable from the topside equipment) for processing (in particular including receiving, transforming, decoding, transforming into a high level data structure, computing derived values or data, comparing to reference or threshold values etc.) a measurement signal received from the at least one second level node (which in turn may have received the measurement signal from a sensor device) and for generating a control signal (or a driving signal for adapting or changing an operational state of an actuator) for transmission to the at least one second level node (wherein the second level node in turn may transmit the control signal to an actuator connected to the second level node), and a second level communication section (in particular comprising a portion of an electronic circuitry or a portion of a hardware, in particular including an interface) for communicating the measurement signal and/or the control signal with the at least one second level node.

For example, there may be a single data communication interface between the first level node and the second level node which may be adapted to transfer and exchange data which are received by the second level node from or which are forwarded by the second level node to a number of subsea devices having different communication interfaces. Thereby, the data communication may be simplified. Further, the first level node may comprise program instructions which allow a coordinated operation of the subsea device or the subsea devices without requiring supervision by the topside equipment.

According to an embodiment the first level node further comprises a water sealed container (in particular a container having a cylindrical shape comprising a cylinder wall) enclosing (in particular tightly sealing) at least one of the topside communication section, the processing section, and the second level communication section. The water sealed container may be adapted to allow installation of one or more connectors for providing the electrical and/or optionally fiberoptical connection to the second level node and to the topside equipment.

According to an embodiment the first level node is connected to the at least one second level node in a star configuration or in a ring configuration or in a line configuration. In a star configuration a single first level node may be connected to each of the at least one second level node. In a ring configuration the first level node may be connected to one of the at least one second level node which may then be connected to another one of the at least one second level node which may in turn be connected to still further second level nodes of the at least one second level node, wherein the last of the at least one second level node is again connected to the first level node. In a line configuration the one or more of the at least one second level node may be connected in a linear way mutually connecting a pair of second level nodes and the first level node may be connected either in between two of the at least one second level node or at an end of the linear chain of second level nodes.

According to an embodiment the first level node is configurable from the equipment above the sea surface of the seal. Thereby, it may be easy to change a coordination of subsea devices which is performed by the first level node by reprogramming or reconfiguration of the first level node from above the surface of the sea. Thereby, the arrangement for controlling and/or monitoring may be flexibly employed.

According to an embodiment the arrangement is adapted for controlling and/or monitoring at least one subsea device, wherein the at least one subsea device comprises at least one electronic or electric device of a subsea electric power grid, in particular a transformer, a controllable switch, a converter, an inductor and/or a capacitor. A transformer may transform an input voltage to a higher or to a lower output voltage. A controllable switch may for example comprise a semiconductor switch, such as a transistor. The converter may for example comprise a fixed AC frequency-to-variable frequency AC converter, which may convert an alternating input signal having a fixed frequency to an alternating signal having a variable frequency, for in particular driving a pump or a motor. Further, the converter may for example be adapted for converting a variable frequency AC signal to a fixed frequency AC signal. The inductor may comprise a coil having a wire winding. The capacitor may be adapted for storing an electric charge.

According to an embodiment the arrangement further comprises at least one third level node (providing a further hierarchical level below the second level node, the third level node in particular comprising a water tight container comprising electronic or electric circuitry) electrically connected to the at least one second level node (but in particular not electrically and/or optionally fiberoptically connected to the first level node and not electrically and/or optionally fiberoptically connected to the topside equipment), wherein the at least one second level node is electrically connectable to the at least one subsea device via the at least one third level node (wherein in particular the second level node is not directly connected or connectable to the at least one subsea device) and wherein the at least one third level node is arrangeable at the sea bottom of the sea. Thereby, a hierarchical control and monitoring system having one, two, three, four, five or even more hierarchical levels may be provided, wherein each level may be adapted to perform some kind of intelligent function based on data obtained from the sensors connected thereto and for controlling actuators connected thereto. Sensor data and/or control data may be communicated or exchanged with the next higher hierarchical level.

According to an embodiment a method for controlling and/or monitoring at least one subsea device is provided, wherein the method comprises communicating controlling data and/or monitoring data between at least one second level node and the at least one subsea device, wherein the at least one second level node is arranged at a sea bottom of a sea; and communicating the controlling data and/or monitoring data between the at least one second level node and a first level node, wherein the first level node is connectable to an equipment above a sea surface of the sea and wherein the first level node and the at least one second level node are electrically connected.

It should be noted that features (individual or in any combination) disclosed, provided, employed, explained or applied to an arrangement for controlling and/or monitoring at least one subsea device may also be (individually or in any combination) employed for, applied to and/or used for a method for controlling and/or monitoring at least one subsea device according to an embodiment.

According to an embodiment the control and monitoring method is performed at a depth below the sea surface, wherein the depth amounts to between 500 m and 5000 m, in particular between 2000 m and 4000 m. Thereby, the method may be employed for example for an oil exploration operation.

According to an embodiment the control and/or monitoring method further comprises measuring at least one of a pressure and a temperature (or any other physical quantity such as sand, vibration, etc) by a sensor comprised in a first subsea device of the at least one subsea device to obtain measurement data and transferring the measurement data to the first level node via the second level node. In particular, the second level node may perform some pre-processing of the measurement data, such as a formatting or transforming or decoding the measurement data before transferring the measurement data to the first level node. Thereby, in particular the second level node may perform functions that are specific for the first subsea device, wherein these specific functions may not be performed by the first level node to simplify the method.

According to an embodiment the method further comprises, after transferring the measurement data, determining control data by the first level node based on the measurement data (wherein still further measurement data may be included for determining the control data); transferring the control data from the first level node via the second level node to an actuator comprised in a second subsea device of the at least one subsea device (wherein in particular the second subsea device may be connected to another second level node, wherein the control data are transferred from the first level node via the other second level node to the actuator comprised in the second subsea device); and controlling the actuator, in particular a pump or a compressor, based on the control data. Thereby, in particular the first level node may perform functions for coordinating the at least one subsea device which are in a conventional method performed only by the topside equipment.

According to an embodiment the arrangement for controlling and/or monitoring the subsea device further comprises the at least one subsea device which in turn comprises at least one of a sensor and an actuator, wherein the subsea device is connected to the second level node.

It has to be noted that embodiments of the invention have been described with reference to different subject matters. In particular, some embodiments have been described with reference to method type claims whereas other embodiments have been described with reference to apparatus type claims.

However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 1 illustrates in a schematic form an arrangement 100 for controlling and/or monitoring at least one subsea device 101 according to an embodiment. The arrangement 100 comprises a first level node 103 (also referred to as subsea main control node) which is electrically and/or optionally fiberoptically connectable to an equipment 105 located above a sea surface 107 of a sea 109. In particular, the first level node 103 is electrically and/or optionally fiberoptically connected to the topside equipment 105 using an electrical and/or optionally fiberoptic wire 111. In particular, the topside equipment 105 provides electrical energy to the first level node 103 via the electrical cable 111.

Further, using the electrical wire 111, communication data are exchanged between the topside equipment 105 and the first level node 103. For this purpose, the topside equipment 105 comprises a topside communication device 113 and the first level node 103 comprises a corresponding topside communication device 115 which adapt data to be communicated between the topside equipment 105 and the first level node 103.

Further, the first level node 103 comprises a subsea main control node 117 (also referred to as a processing section) for processing and/or transforming and/or decoding and/or encoding the data to be exchanged with the topside equipment 105 or one of the second level nodes 119, as is described below. The subsea main control node or processing section is labelled with reference sign 117.

The first level node 103 is further adapted for communicating data (or providing electric energy) with at least one second level node 119 from which in FIG. 1 only two second level nodes 121 and 123 are illustrated. The arrangement 100 may comprise in alternative embodiments 1, 3, 4, 5, 6 or 7 to 20 or 7 to 100 second level control nodes 119. For communicating data between the second level nodes 119 the first level node 103 comprises a subsea communication device 125 (also referred to as second level communication section) comprising hardware and/or software enabling adaptation of the data to adhere to particular data transfer protocols.

The first level control node 103 is connected via electrical and/or optionally fiberoptical wires 127 to the different second level nodes 119, 121, 123. The second level nodes 119 comprise a subsea communication device 129, 131 which may be different for different second level nodes 121, 123 or may be same for different second level nodes 121, 123. The electrical and/or optionally fiberoptical cables 127 or the electrical cables 127 together with the subsea communication device 121, 123 and 125 form a subsea data bus 133 via which the second level nodes 119, 121, 123 are electrically and/or optionally fiberoptically connected to the first level node 103.

The second level node 121 comprises a subsea sublevel control node 135 (also referred to as data interface) for communicating with one or more subsea devices 101 which in the illustrated embodiment comprise one or more sensors 137 and one or more actuators 139.

Further, the second level node 123 comprises a subsea sublevel control node 141 (also referred to as data interface) for data communication to one or more sensors 143 and/or to one or more actuators 145. The one or more sensors 137 may have interfaces of different or same type for data communication, the actuators 139, the sensors 143 and the actuators 145 may have same or different kinds of interfaces for data communication to the second level nodes 121, 123. Accordingly, the data interfaces 135, 141 may be adapted to interface with a number of same or different types of device interfaces.

In the embodiment illustrated in FIG. 1 the first level node 103 is connected to the second level nodes 119 in a star configuration, while in other embodiments it is connected in a ring configuration or in a line configuration.

In particular, the first level node and the second level nodes 119 and also the subsea devices 101 may be arranged at or at least close to a bottom 108 of the sea. In particular, these components may be fixed or attached at some base element of an operational area, such as an oil bore operation site. The bottom 108 of the sea is located at a depth of 3000 m below the surface level 107 of the sea 109.

According to an embodiment one of the sensors 137 generates a measurement signal which is transferred via the electrical wires 138 using the data interface 135 to the second level node 121 which in turn forwards the measurement data via the electrical and/or optionally fiberoptical wire 127 to the first level node 103 which receives the measurement data via the subsea communication device 125. Based on these measurement data (or based on additional measurement data received from other sensors) the first level node 103 computes using the processing section 117 control data for an actuator of the actuators 145 which are connected to the other second level node 123.

For transferring the control data to the actuator 145 the first level node 103 transmits the control data via the subsea communication device 125, the electrical wire 127 to the second level node 123 which receives the control data via the subsea communication device 131. Using the subsea sublevel control node 141 (also referred to as data interface) the second level control node 123 forwards the control data to one of the actuators 145 based on which it will perform a particular function, such as starting or stopping pumping, in particular pumping oil.

Thereby, it should be noted, that it is not required to forward or transmit the measurement data from the sensor 137 up to the topside equipment 105, but only to the first level node 103. In particular, the first level node 103 has sufficient functionality and logic/arithmetic capability to coordinate actions or operations of one or more actuators 139, 145 based on measurement data received for from one or more sensors 137, 143. Thereby, the method for monitoring and/or controlling sensors and/or actuators may be simplified.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

100 Arrangement for controlling and/or monitoring
101 Subsea devices

103 First level node
105 Topside equipment
107 Surface level of the sea
109 Sea
108 Bottom of the sea
111,127,138 Electrical wires or fiberoptical conductors
113 Topside communication device
115 Topside communication section
117 Processing section
119,121,123 Second level nodes
125 Second level communication section
129,131 Subsea communication device
133 Subsea data bus
135,141 Subsea sublevel control node
137,143 Sensor devices
139,145 Actuator devices

What is claimed is:

1. An arrangement for controlling and/or monitoring subsea devices comprising sensors and actuators located below a surface of a sea having a bottom, the arrangement comprising:
   a first level subsea processor node in a first water sealed container and configured for (i) arrangement at a bottom of a sea, (ii) electrical or fiber-optic connection to equipment above the surface of the sea for communication with the equipment, and (iii) connection to multiple second level subsea router nodes configured for arrangement at the bottom of the sea;
   a first second level subsea router node in a first second water sealed container and configured for arrangement at the bottom of the sea, electrically or fiber-optically connected to the first level subsea processor node via a first connector, wherein the first second level subsea router node comprises two or more communication interfaces with the subsea devices;
   a first subsea device of the subsea devices configured for arrangement at the bottom of the sea comprising a first subsea sensor that generates a first measurement signal and a first subsea actuator that receives a first command signal, wherein the first subsea device is electrically or fiber-optically connected to the first second level subsea router node via a second connector, wherein the first second level subsea router node is configured to receive the first measurement signal from the first subsea sensor, generate the first command signal based at least in part on the first measurement signal, and communicate the first command signal to the first subsea actuator;
   a further second level subsea router node in a further second water sealed container and configured for arrangement at the bottom of the sea, electrically or fiber-optically connected to the first level subsea processor node via a third connector, wherein the further second level subsea router node comprises two or more communication interfaces with the subsea devices, wherein the first level subsea processor node is connected to the multiple second level subsea router nodes in a ring configuration;
   a second subsea device of the subsea devices configured for arrangement at the bottom of the sea comprising a second subsea sensor that generates a second measurement signal and a second subsea actuator that receives a second command signal, wherein the second subsea device is electrically or fiber-optically connected to the further second level subsea router node via a fourth connector, wherein the further second level subsea router node comprises a receiver configured to receive the second measurement signal from the second subsea sensor, a generator configured to generate a second command signal based at least in part on the second measurement signal, and a transmitter configured to communicate the second command signal to the second subsea actuator;
   wherein the first level subsea processor node comprises:
      a topside communication section for communicating with the equipment above the surface of the sea,
      a processing section for processing the first measurement signal received from the first second level subsea router node and for generating the first command signal at the bottom of the sea for transmission to the first second level subsea router node, a receiver of measurement signals from the first subsea sensor and the second subsea sensor and a transmitter of command signals to the first subsea actuator and second subsea actuator without communicating with the equipment above the surface of the sea, and
      a second level communication section for communicating the first measurement signal and the first command signal with the first second level subsea router node.

2. The arrangement of claim 1, further comprising a subsea data bus via which the first second level subsea router node is electrically or fiber-optically connected to the first level subsea processor node.

3. The arrangement of claim 1, wherein the first second level subsea router node is adapted to communicate with at least one of the subsea devices using at least one of the two or more communication interfaces of the first second level subsea router node.

4. The arrangement of claim 1,
   wherein the further second level subsea router node comprises two second level subsea router nodes, and
   wherein at least one of the two further second level subsea router nodes is adapted:
      to receive the first measurement signal from the first subsea sensor included in the first subsea device, and
      to transmit the first control signal to the second subsea actuator included in the second subsea device, wherein the first control signal is based on the first measurement signal.

5. The arrangement of claim 1, wherein the first water sealed container of the first level subsea processor node further comprises a water sealed container enclosing at least one of the topside communication section, the processing section, and the second level communication section.

6. The arrangement of claim 1, wherein the first level subsea processor node is configurable from the equipment above the surface of the sea.

7. The arrangement of claim 1, wherein the subsea devices comprise at least one electrical device of a subsea electric power grid selected from a group consisting of a transformer, a controllable switch, a converter, an inductor, and a capacitor.

8. The arrangement of claim 1, further comprising:
   at least one third level communicator node in a third water sealed container and electrically or fiber-optically connected to the first second level subsea router node via a fifth connector,
   wherein the first second level subsea router node is electrically or fiber-optically connectable to at least one of the subsea devices via the fifth connector of the at least one third level communicator node, and
   wherein the at least one third level communicator node is configured for arrangement at the bottom of the sea.

9. A method for controlling and/or monitoring a subsea device located below a surface of a sea having a bottom, the method comprising:

measuring a physical characteristic by a subsea sensor provided in the subsea device to obtain measurement data;

transferring the measurement data from the subsea sensor to a first level subsea processor node in a first water sealed container arranged at the bottom of the sea via a second level subsea router node in a second water sealed container arranged at the bottom of the sea and connected to the subsea device via a connector, wherein the second level subsea router node comprises two or more communication interfaces with the subsea device, wherein the first level subsea processor node is connected to the second level subsea router node in a ring configuration, wherein the first level subsea processor node comprises:

a topside communication section for communicating with an equipment above the surface of the sea, a processing section for processing the measurement data received from the second level subsea router node and for generating a control signal at the bottom of the sea for transmission to the second level subsea router node, a receiver of measurement data from the subsea sensor and a transmitter of the control signal to a subsea actuator without communicating with the equipment above the surface of the sea, and a second level communication section for communicating the measurement data and the control signal with the first second level subsea router node;

processing the measurement data at the bottom of the sea in the first level subsea processor node arranged at the sea bottom of the sea;

generating control signal at the bottom of the sea in the first level subsea processor node based on the measurement data received from the subsea sensor via the second level subsea router node;

transferring the control signal from the first level subsea processor node via the second level subsea router node to the subsea device; and controlling the subsea device based on the control signal generated at the bottom of the sea by the first level subsea processor node.

10. The method of claim 9, wherein the method is performed at a depth below the surface of the sea between 500 meters and 5,000 meters.

11. The method of claim 9, wherein the method is performed at a depth below the surface of the sea between 2,000 meters and 4,000 meters.

12. The method of claim 9, further comprising: transferring the control signal from the first level subsea processor node via the second level subsea router node to the subsea actuator comprised in the subsea device; and controlling the subsea actuator based on the control signal.

13. The method of claim 9, wherein the subsea actuator comprises a pump or a compressor.

* * * * *